United States Patent
Iida et al.

(10) Patent No.: US 6,487,160 B1
(45) Date of Patent: Nov. 26, 2002

(54) OPTICAL PICKUP, INFORMATION RECORDING APPARATUS AND INFORMATION REPRODUCING APPARATUS

(75) Inventors: Tetsuya Iida, Tsurugashima (JP); Osamu Kasono, Tsurugashima (JP); Masayuki Iwasaki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/527,457

(22) Filed: Mar. 17, 2000

(30) Foreign Application Priority Data

Mar. 18, 1999 (JP) .......................................... 11-074220

(51) Int. Cl.⁷ ................................................. G11B 7/00
(52) U.S. Cl. ................................. 369/112.02; 369/44.23
(58) Field of Search ........................ 369/44.23, 112.02, 369/116, 53.26, 53.27, 118

(56) References Cited

U.S. PATENT DOCUMENTS

| | | | | |
|---|---|---|---|---|
| 5,202,875 A | * | 4/1993 | Rosen et al. | 369/112.2 |
| 5,734,637 A | * | 3/1998 | Ootaki et al. | 369/118 |
| 5,748,603 A | * | 5/1998 | Kim et al. | 369/112.02 |
| 6,078,556 A | * | 6/2000 | Furukawa et al. | 369/112.02 |
| 6,084,842 A | * | 7/2000 | Miura | 369/44.23 |
| 6,137,764 A | * | 10/2000 | Tsuchiya et al. | 369/112.02 |
| 6,141,304 A | * | 10/2000 | Ogasawara | 369/44.23 |
| 6,167,018 A | * | 12/2000 | Morimoto et al. | 369/44.23 |
| 6,198,465 B1 | * | 3/2001 | Furukawa et al. | 369/44.23 |
| 6,370,095 B1 | * | 4/2002 | Ogasawara | 369/112.02 |
| 6,388,967 B2 | * | 5/2002 | Furukawa et al. | 369/112.02 |

* cited by examiner

*Primary Examiner*—Thang V. Tran
*Assistant Examiner*—Bach Q Voung
(74) *Attorney, Agent, or Firm*—Morgan, Lewis & Bockius LLP

(57) ABSTRACT

An optical pickup is provided with: a light emitting device for emitting a light beam onto a record medium comprising a transparent layer, which is transparent for the light beam and through which the light beam is transmitted; a light receiving device for receiving a reflection light of the light beam from the record medium; a liquid crystal compensating device for compensating birefringence, which is generated in the light beam when the light beam is transmitted through the transparent layer, by controlling an orientation direction of liquid crystal molecules in a liquid crystal layer so as to give a canceling phase difference to the light beam transmitted through the liquid crystal layer; a generating device for generating an indication signal indicative of the birefringence; and a controlling device for controlling the orientation direction on the basis of the indication signal so that a first angle between a standard line, which is perpendicular to an optical axis of the light beam and is set in advance, and the orientation direction in a plane perpendicular to the optical axis is kept to be constant and that a second angle between the optical axis and the orientation direction in a plane including the optical axis is changed, to thereby generate the canceling phase difference in the light beam transmitted through the liquid crystal compensating device.

12 Claims, 8 Drawing Sheets

OPTICAL PICKUP, INFORMATION RECORDING APPARATUS AND INFORMATION REPRODUCING APPARATUS

BACKGROUND OF THE INVENTION

1. Field of the Invention

The present invention generally relates to an optical pickup for optically recording and/or reproducing information with respect to a record medium, and an information recording apparatus and an information reproducing apparatus having such an optical pickup. More particularly, the present invention relates to an optical pickup for recording and/or reproducing the information with compensating birefringence (or double refraction) generated in a light beam and a reflection beam thereof due to an optical characteristic of a light-transmissible layer which is disposed on the record medium and which transmits the light beam, and an information recording apparatus and an information reproducing apparatus having such an optical pickup.

2. Description of the Related Art

A so-called optical disc, for which various developments are being performed recently in various fields, is a record medium allowing to record and reproduce a large volume of information In case of recording and reproducing information with respect to the optical disc by using a light beam such as a laser light, a structure as described below is often employed.

Namely, a linearly polarized light beam is firstly generated from a laser light source. Then, the light beam is transmitted through a polarization beam splitter (i.e., an optical element for reflecting or transmitting the light beam depending upon the direction of the polarization), and is inputted to a ¼ wavelength plate. Then, the light beam, which has been linearly polarized, is converted into a circularly polarized light beam by a phase difference adding function of the ¼ wavelength plate. After that, this light beam is inputted to an objective lens and is collected onto the optical disc.

On the other hand, the reflection light, which is generated as the optical disc reflects the light beam, becomes a circularly polarized light beam whose turn is reverse to that before the reflection. Then, as this light beam is transmitted again through the ¼ wavelength plate, it becomes a linearly polarized light beam whose polarization direction is different by 90 degrees from that on the approaching path and is inputted again to the polarization beam splitter. Then, this light beam is reflected by the polarization beam splitter, is guided toward a light detector side without returning to the original laser light source side, is received by the light detector and is converted into an electric signal.

After this, in case of recording the information onto the optical disc, a position on the optical disc at which the information is to be recorded is detected on the basis of the electric signal, or the intensity of the light beam for recording is controlled. On the other hand, in case of reproducing the information from the optical disc, the information is reproduced on the basis of the electric signal.

Here, assuming that birefringence is generated in the light beam, when the light beam is transmitted through a substrate or a protection layer constituting the optical disc, due to an irregularity of material of the substrate or protection layer, the polarization of the light beam on the returning path reflected from the optical disc does not become the circularly polarized light beam precisely reverse to that on the approaching path. The polarization condition of the light beam on the returning path may be various in correspondence with the generated amount of the birefringence.

Then, when the light beam in such a condition is inputted again to the polarization beam splitter, all of the light beam is not reflected, but some portion of the light beam is transmitted and returns to the laser light side. As a result, the light detection amount at the light detector is decreased. In other wards, depending upon the amount of the birefringence generated in the light beam at the optical disc, the light detection amount at the light detector may be less than the limit for reproduction.

However, for example, among the CDs (Compact Discs) presently on sale, there exist a CD by which the generated amount of the birefringence is extremely large, and a CD by which the generated amount of the birefringence is drastically changed depending upon the position in the optical disc. Thus, there is a problem that a signal reproduction for such a CD cannot be performed by the above mentioned conventional reproduction optical system.

At this time, even in case. of using the conventional reproduction optical system, it is possible to compensate the birefringence generated by the optical disc by rotating the ¼ wavelength plate. However, in this case, a mechanical and complicated control structure is required, so that the structure of the optical pickup itself becomes complicated and the production cost is drastically increased, which is another problem.

SUMMARY OF THE INVENTION

It is therefore an object of the present invention to provide an optical pickup, which can compensate the influence of the birefringence effectively by an electrical control without a mechanical control, and an information recording apparatus and an information reproducing apparatus having such an optical pickup.

The above object of the present invention can be achieved by an optical pickup provided with: a light emitting device such as a laser diode for emitting a light beam onto a record medium such as an optical disc comprising a transparent layer such as a transparent substrate, which is transparent for the light beam and through which the light beam is transmitted; a light receiving device such as a detector for receiving a reflection light of the light beam from the record medium; a liquid crystal compensating device such as a liquid crystal panel for compensating birefringence, which is generated in the light beam when the light beam is transmitted through the transparent layer, on the basis of the reflection light received by the light receiving device, by controlling an orientation direction of liquid crystal molecules in a liquid crystal layer so as to give a canceling phase difference, which is to cancel the birefringence, to the light beam transmitted through the liquid crystal layer; a generating device such as an amplitude detection circuit for generating an indication signal indicative of the birefringence on the basis of the reflection light received by the light receiving device; and a controlling device such as a driver for controlling the orientation direction on the basis of the indication signal so that a first angle between a standard line, which is perpendicular to an optical axis of the light beam and is set in advance, and the orientation direction in a plane perpendicular to the optical axis is kept to be constant and that a second angle between the optical axis and the orientation direction in a plane including the optical axis is changed, to thereby generate the canceling phase difference in the light beam transmitted through the liquid crystal compensating device.

According to the optical pickup of the present invention, the canceling phase difference is generated in the light beam just by changing the first angle of the orientation direction of the liquid crystal molecules. That is to say, the canceling phase difference is generated without changing the direction of the linearly polarized plane of the light beam (i.e., without rotating the direction of the linearly polarized plane). Therefore, it is possible to electrically compensate the birefringence generated in the light beam and the reflection light thereof effectively.

Further, since only the first angle of the orientation direction is changed, it is not necessary to employ the liquid crystal composition adapted to change the second angle of the orientation direction, so that it is possible to simplify the adjustment of the liquid crystal when constituting the liquid crystal compensating device.

In one aspect of the optical pickup of the present invention, the light receiving device generates a light detection signal, and the generating device generates the indication signal such that the indication signal indicates a cancellation of the birefringence by the canceling phase difference when the amplitude of the light detection signal becomes the maximum and outputs the generated indication signal to the controlling device.

Therefore, the birefringence is compensated as the controlling device controls the liquid crystal compensating device so that the amplitude of the light detection signal becomes the maximum, it is possible to compensated the birefringence by means of a relatively simple construction.

In another aspect of the optical pickup of the present invention, the liquid crystal compensating device comprises: the liquid crystal layer; two orientation films, which is disposed to sandwich the liquid crystal layer and is transparent for the light beam, for orienting the liquid crystal molecules such that the first angle is kept to be constant as for all of the liquid crystal molecules; and a voltage applying device such as a transparent electrode, which is disposed to sandwich the liquid crystal layer and the orientation films and is transparent for the light beam, for applying a control voltage, which is to control the second angle, to the liquid crystal molecules.

According to this aspect, since the first angle is made constant by the orientation films and since the canceling phase difference is generated as the voltage applying device changes the second angle, it is possible to compensate the birefringence effectively.

In this aspect of the optical pickup, the orientation films may be formed such that the first angle is 45 degrees with respect to each linearly polarized plane of the light beam before the light beam is transmitted through the liquid crystal layer, and the controlling device controls the orientation direction so that the canceling phase difference is generated in the light beam by changing the second angle with the second angle as a center, which gives to the light beam a phase difference corresponding to ¼ of a wavelength of the light beam.

Accordingly, since the first angle of the orientation direction of the liquid crystal molecules is constant at the 45 degrees with respect to each linearly polarized plane of the light beam and since the orientation direction is controlled so that the canceling phase difference is generated in the light beam by changing the second angle with the second angle as a center, which gives to the light beam a phase difference corresponding to ¼ of a wavelength of the light beam, the liquid crystal compensating device functions as a so-called ¼ wavelength plate with respect to the light beam. Thus, it is not necessary to equip the ¼ wavelength plate separately.

Therefore, it is possible to compensate the birefringence in the light beam while simplifying the structure of the optical pickup.

The above object of the present invention can be also achieved by an information recording apparatus provided with (A) the above described optical pickup of the present invention (including its various aspects), (B) a detecting device such as a reproduction circuit and a CPU for detecting record control information, which is recorded in advance on the record medium, on the basis of the reflection light received by the light receiving device, and (C) a modulating device such as a modulation circuit for modulating record signal to be recorded onto the record medium on the basis of the detected record control information, to thereby generate a modulation signal which controls the light emitting device to emit the light beam having an intensity corresponding to the modulation signal.

According to the information recording apparatus of the present invention, since the birefringence is not included in the light beam when detecting the record control information, it is possible to detect the record control information more precisely and record the record information onto the record medium.

The above object of the present invention can be also achieved by an information reproducing apparatus provided with (A) the above described optical pickup of the present invention (including its various aspects), and (B) a reproducing device such as a reproduction circuit for reproducing record information, which is recorded in advance on the record medium, on the basis of the reflection light received by the light receiving device, to thereby output a reproduction signal to an external portion.

According to the information reproducing apparatus of the present invention, since the birefringence is not included in the reflection light, it is possible to reproduce the record information more precisely.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3(*a*) is a diagram showing a change of the orientation direction of the liquid crystal molecule consisting of a set of a sectional view and a plan view of the liquid crystal panel when a driving voltage is not applied;

FIG. 3(*b*) is a diagram showing a change of the orientation direction of the liquid crystal molecule consisting of a set of a sectional view and a plan view of the liquid crystal panel when one driving voltage is applied;

FIG. 3(*c*) is a diagram showing a change of the orientation direction of the liquid crystal molecule consisting of a set of a sectional view and a plan view of the liquid crystal panel when another driving voltage is applied;

DETAILED DESCRIPTION OF THE PREFERRED EMBODIMENTS

Referring to the accompanying drawings, embodiments of the present invention will be now explained.

(I) First Embodiment

At first, a first embodiment of the present invention is explained with reference to FIG. 1 to FIG. 4.

The first embodiment as explained below is an embodiment in which the present invention is applied to an information reproducing apparatus for optically reproducing information from an optical disc on which the information to be reproduced is recorded in advance.

Figure 1:
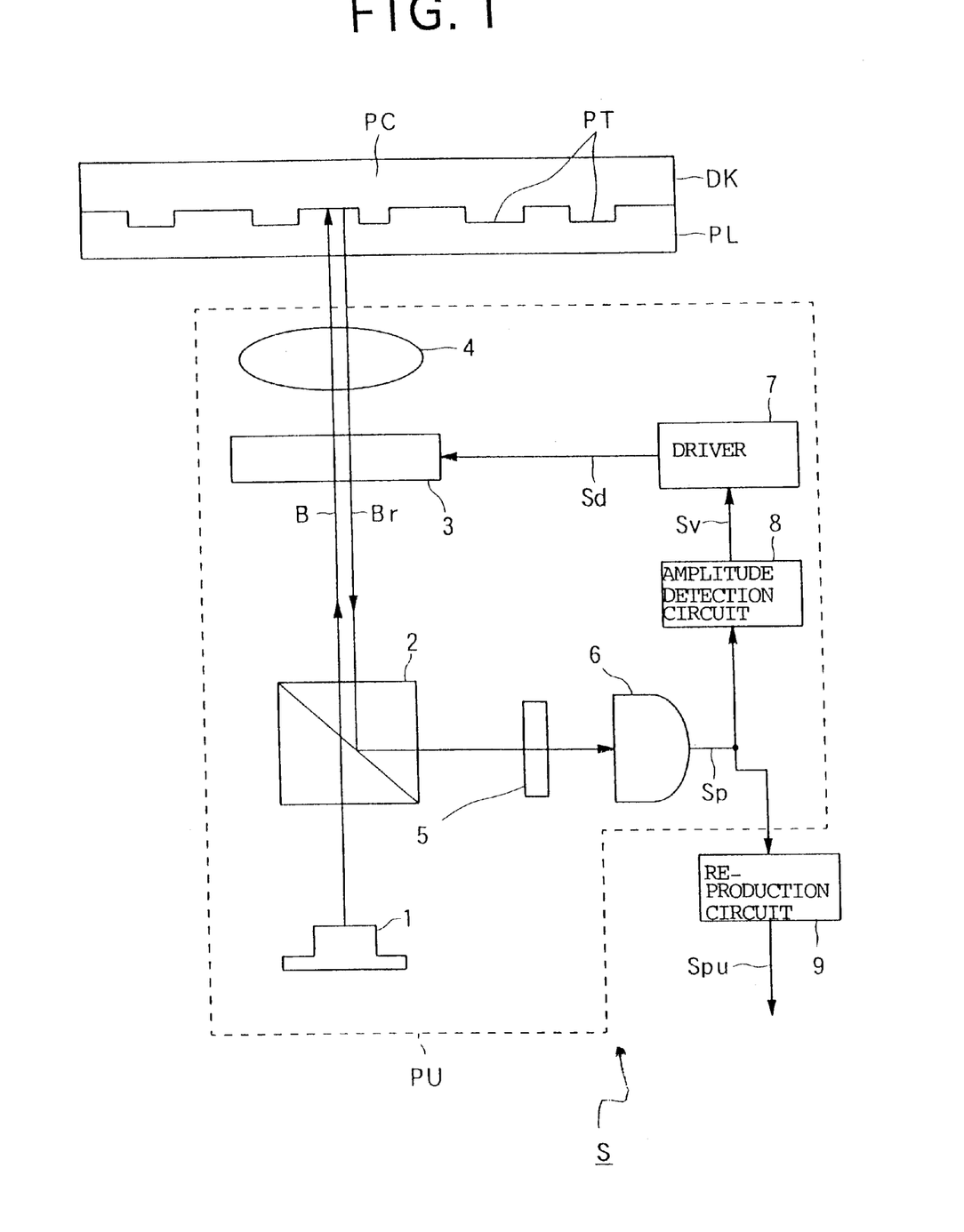
FIG. 1 is a block diagram showing a schematic construction of an information reproducing apparatus as a first embodiment of the present invention.
Figure 2A:
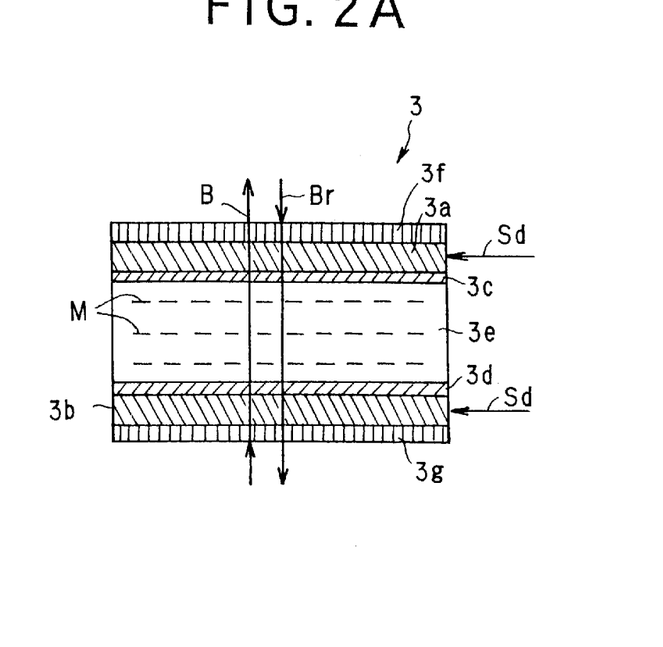
FIG. 2A is a longitudinal cross sectional view showing a structure of a liquid crystal panel in the embodiment.
Figure 2B:
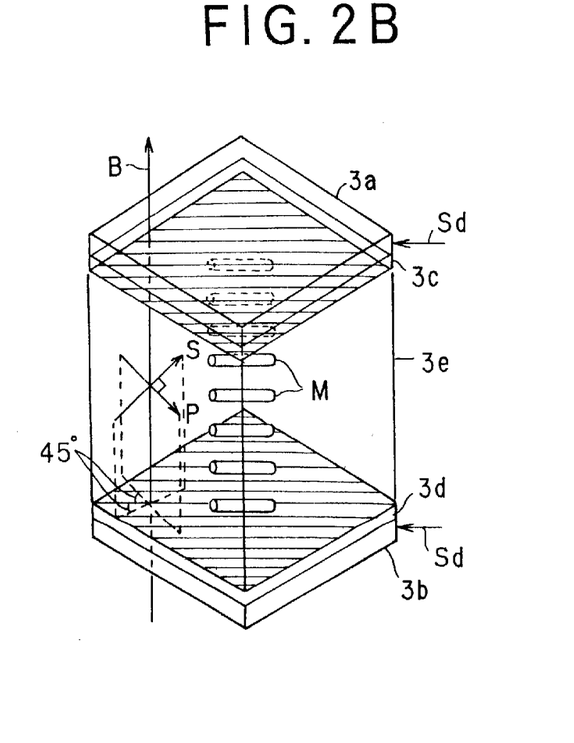
FIG. 2B is a perspective view showing an orientation direction of liquid crystal molecule in the liquid crystal panel of FIG. 2A.

FIG. 1 is a block diagram showing a schematic configuration of the information reproducing apparatus of the first embodiment. FIGS. 2A and 2B are diagrams showing the structure of the liquid crystal panel of the present invention. FIG. 3(a) to FIG. 3(e) are diagrams explaining the operation of the liquid crystal panel. FIG. 4 is a graph showing an operation characteristic of the liquid crystal panel.

At first, the whole construction and operation of the information reproducing apparatus of the first embodiment is explained with reference to FIG. 1.

As shown in FIG. 1, the information reproducing apparatus S of the first embodiment is provided with an optical pickup PU and a reproduction circuit 9 as a reproducing device.

The optical pickup UP is provided with a laser diode 1, a PBS (Polarization Beam Splitter) 2, a liquid crystal panel 3 as a compensating device and a liquid crystal compensating device, an objective lens 4, a cylindrical lens 5, a detector 6 as a detecting device and a light receiving device, a driver 7 as a controlling device and an amplitude detection circuit as a generating device.

An optical disc DK as a record medium on which the information to be reproduced by the information reproducing apparatus S is recorded has a pit PT, which corresponds to the information and is protected by a protection layer PC on a substrate PL as a light-transmissible later, which is transparent with respect to a later described light beam B. The light beam B is irradiated onto the pit PT as the light beam B is transmitted through the substrate PL. A reflection light Br is generated, which is intensity-modulated, by the pit PT as the light beam B is reflected by the pit PT.

At this time, the substrate PL has an optical anisotropy due to the irregularity of the material thereof or the orientation of the molecule constituting the material. By this optical anisotropy, the birefringence which is unnecessary is generated in the transmitted light beam B and the reflection light Br.

Incidentally, FIG. 1 is a block diagram illustrating only the elements related to the present invention of the information reproducing apparatus S. In fact, the actual information reproducing apparatus S is provided with, other than those elements illustrated in FIG. 1, a servo controller for performing a focus servo control and a tracking servo control, which moves the objective lens 4 so as to irradiate the light beam B precisely onto the pit PT to be reproduced, a display unit showing an operation status of the information reproducing apparatus S, an operation unit thorough which an inputting operation is performed so as to designate the operation of the information reproducing apparatus S and so on.

Next, the operation is explained.

At first, the laser diode 1 is driven by a driving circuit, which is not illustrated, so that the light beam B at a constant intensity for information reproduction is generated and is inputted to the PBS 2. At this time, the light beam B is emitted as a linearly polarized light beam having orthogonal two polarization planes (i.e., a so-called P polarization plane and an S polarization plane).

The PBS 2 is formed to transmit the light beam B, so that the light beam transmitted through the PBS 2 is inputted to the liquid crystal panel 3.

By the later described operation of the liquid crystal panel 3 as the ¼ wavelength plate, the polarization of the light beam B is converted from the linear polarization to the circular polarization. By the later described phase difference adding function of the liquid crystal panel 3, a canceling phase difference to cancel and remove the birefringence, which is included in the light beam B and the reflection light Br due to the substrate PL, is added to the light beam B.

After that, the light beam B, whose polarization has been converted into the circular polarization and to which the canceling phase difference is added, is inputted to the objective lens 4. By this, the light beam B is collected onto the pit PT on the optical disc DK Next, the reflection light Br, which is generated as the light beam B is reflected by the pit PT, is transmitted by the liquid crystal panel 3 again through the objective lens 4, and is inputted to the PBS 2. At this time, the polarization of the reflection light Br becomes the circular polarization, whose turn is reverse to that before the reflection by the reflection due to the optical disc DK. Then, the polarization of the reflection light Br becomes the linear polarization whose polarization direction is different by 90 degrees from that on the approaching path as the reflection light Br is transmitted through the liquid crystal panel 3 as the ¼ wavelength plate again, and the reflection light B is inputted to the PBS 2.

Then, after the astigmatism is given to the reflection light Br reflected by the PBS 2, in order to focus-servo-control the focal position of the light beam B by means of the so-called astigmatism method, the reflection light Br is detected by the detector 6. Then, it is converted into a light detection signal Sp having a level proportional to the intensity of the reflection light Br, and is it outputted to the amplitude detection circuit 8 and the reproduction circuit 9.

By this, the reproduction circuit 8 applies a demodulation process and the like to the light detection signal Sp, generates a reproduction signal Spu corresponding to the information on the optical disc DK to be reproduced, and outputs it to the external portion.

On the other hand, the amplitude detection circuit 8 detects the amplitude of the light detection signal Sp, generates a detection signal Sv indicating the amplitude, and outputs it to the driver 7.

Then, the driver 7 generates a driving signal Sd and outputs it to the liquid crystal panel 3 in order to apply a driving voltage to the liquid crystal molecule in the liquid crystal panel 3 so that the amplitude of the light detection signal Sp indicated by the detection signal Sv may become the maximum. At this time, the driving signal Sd is a signal to drive the liquid crystal panel 3 so that the amplitude may become the maximum since the time when the amplitude of the light detection signal Sp becomes the maximum is supposed to be the time when all of the reflection light Br, the birefringence in which is removed as much as possible, is inputted to the detector 6 (in other words, since the canceling phase difference to cancel or remove the birefringence as much as possible is added to the light beam B and the reflection light Br by the liquid crystal panel 3).

Next, the structure of the liquid crystal panel 3 in the first embodiment is explained with reference to FIG. 2A and FIG. 2B.

FIG. 2A is a longitudinal cross sectional view showing a structure of the liquid crystal panel 3, and FIG. 2B is a perspective view showing a relationship between the orientation direction for the light beam B and the orientation film described later.

As shown in FIG. 2A, in the liquid crystal panel 3 of the first embodiment, two orientation films 3c and 3d are formed so as to interpose a liquid crystal layer 3e, which includes liquid crystal molecules M having the optical anisotropy of two orthogonal axes, between the orientation films 3c and 3d. The orientation direction in the plane perpendicular to the optical axis of the light beam B or the reflection light Br respectively among the orientation directions of the liquid crystal molecules M is determined by those two orientation films 3c and 3d. The above mentioned driving voltage is applied to the liquid crystal molecules M by transparent electrodes described later so that the orientation direction in the plane perpendicular to each optical axis is kept to be constant.

Next, a transparent electrode 3a, which is in a thin film plane shape, which is transparent with respect to the light beam B and the reflection light Br and which comprises an ITO (Indium Tin Oxide) etc., is formed on a plane of the orientation film 3c opposite to the liquid crystal layer 3e. A transparent electrode 3b, which is also in a thin film plane shape, which is transparent with respect to the light beam B and the reflection light Br and which comprises an ITO etc., is formed on a plane of the orientation film 3d opposite to the liquid crystal layer 3e. As the driving signal Sd is applied by the driver 7 respectively to those two transparent electrodes 3a and 3b, an electric field in a direction parallel to the optical axis of the light beam B or the reflection light Br respectively is applied to the liquid crystal molecules M, so that the liquid crystal molecules M are driven to fall or collapse in the plane including the optical axis by this electric field as described later. Then, as the liquid crystal molecules M, which have the above mentioned optical anisotropy of two axes, fall in the plane including each optical axis, the canceling phase difference (i.e., the canceling phase difference to cancel or remove the birefringence added to the light beam B and the reflection light Br by the substrate PL) is added to the light beam B and the reflection light Br. At this time, as the angle between the liquid crystal molecules M and each optical axis in the plane including each optical axis is the larger (i.e., as the liquid crystal molecules M fall in more degrees with respect to each optical axis), the larger canceling phase difference can be added to the light beam B and the reflection light Br.

On the further outer side of each of the transparent electrodes 3a and 3b, glass substrates 3f and 3g are respectively formed so as to protect the above mentioned liquid crystal layer 3e, the orientation films 3c and 3d and the transparent electrodes 3a and 3b.

Next, among the orientation directions of the liquid crystal molecules M, the above mentioned orientation direction in the plane perpendicular to each optical axis is explained with reference to FIG. 2B.

As shown in FIG. 2B, in the liquid crystal panel 3, the orientation films 3c and 3d are formed so that the orientation direction of the liquid crystal molecules M in the plane perpendicular to each optical axis respectively becomes constant angle of 45 degrees with respect to each polarization direction of the light beam B (i.e., the direction of the P polarization plane and the S polarization plane orthogonal to each other). At this time, the orientation directions at the orientation films 3c and 3d are parallel to each other. Then, the orientation direction of the liquid crystal molecules M in the plane perpendicular to each optical axis is kept to be constant even at the time of the rotation of the liquid crystal molecules M due to the application of the driving signal Sd (the rotation in the plane including each optical axis).

Next, the driving operation of the liquid crystal panel 3 is explained with reference to FIG. 3(a) to FIG. 3(e) and FIG. 4.

FIG. 3(a) to FIG. 3(e) are diagrams showing the change of the orientation direction of the liquid crystal molecules M gradually when the driving voltage of the driving signal Sd is changed. FIG. 4 is a graph showing an actual relationship between the voltage of the driving signal Sd in the liquid crystal panel 3 and the phase difference (which is standardized by the wavelength of the light beam B) generated by the voltage in the light beam B and the reflection light Br. At this time, in each of FIG. 3(a) to FIG. 3(e), the longitudinal cross sectional view shown on the left side corresponds to an A-A-A' section of the plan view shown on the right side.

As described above, in the first embodiment, while, among the orientation directions of the liquid crystal molecules M, the orientation direction in the plane perpendicular to each optical axis of the light beam B and the reflection light Br is kept to be constant, the canceling phase difference to cancel the above mentioned birefringence is generated for the light beam B and the reflection light Br by changing the orientation direction in the plane including each optical axis.

Figure 3A:
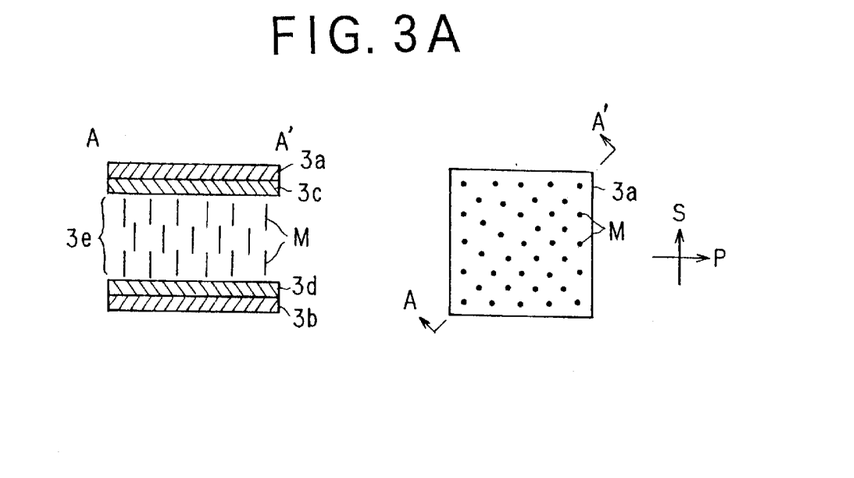
Figure 3B:
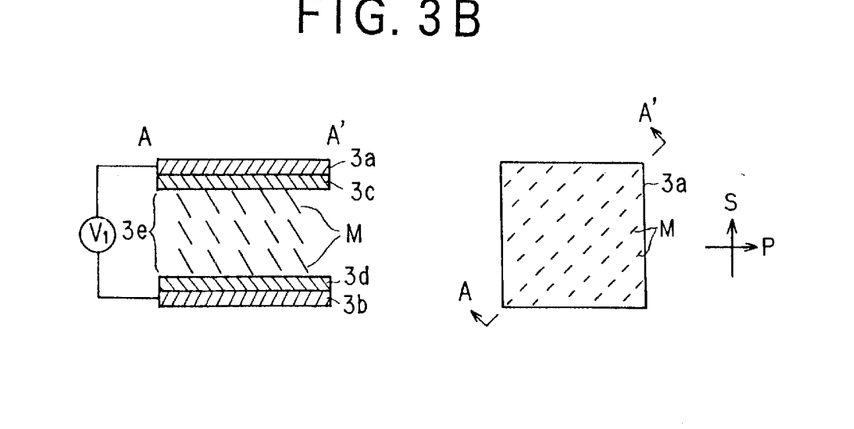
Figure 3C:
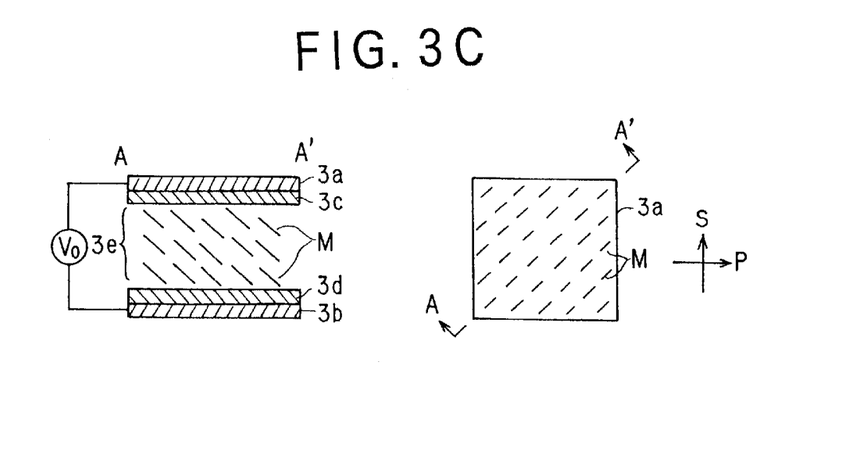
Figure 3D:
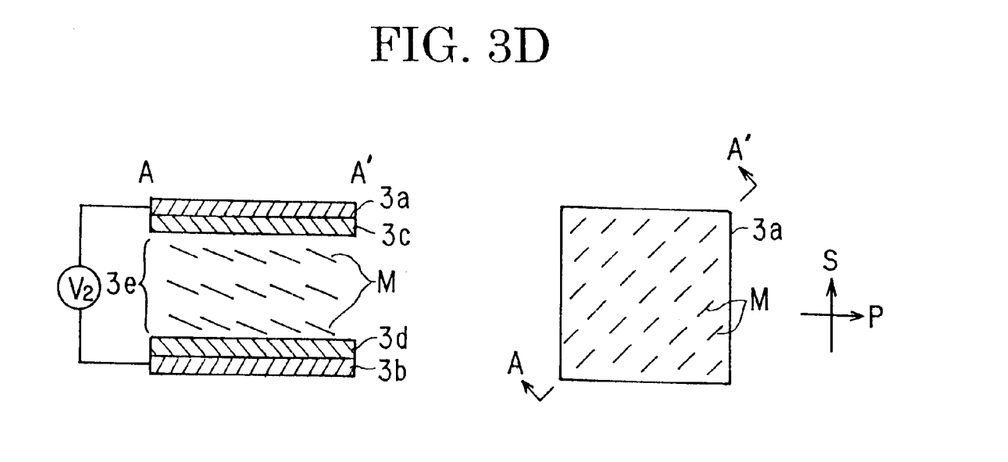
FIG. 3(d) is a diagram showing a change of the orientation direction of the liquid crystal molecule consisting of a set of a sectional view and a plan view of the liquid crystal panel when another driving voltage is applied.
Figure 3E:
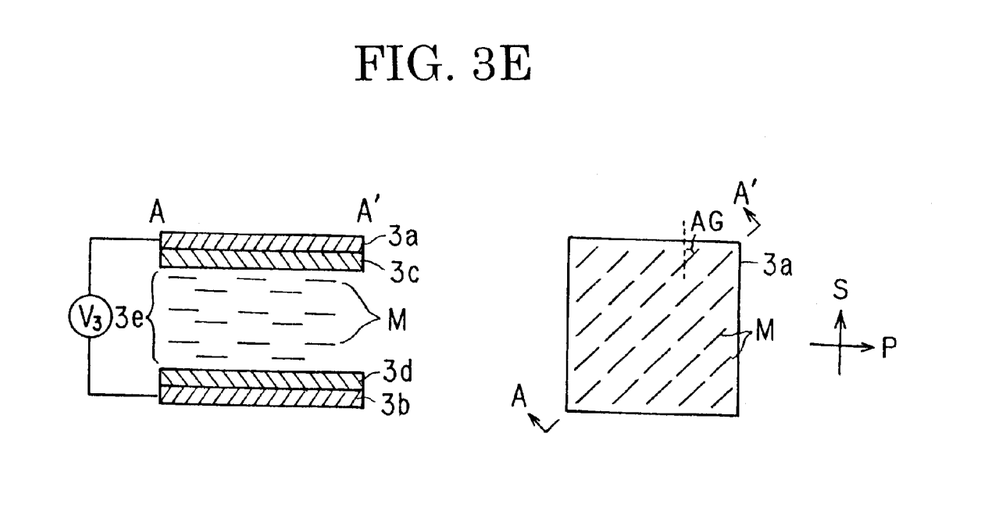
FIG. 3(e) is a diagram showing a change of the orientation direction of the liquid crystal molecule consisting of a set of a sectional view and a plan view of the liquid crystal panel when another driving voltage is applied.
Figure 4:
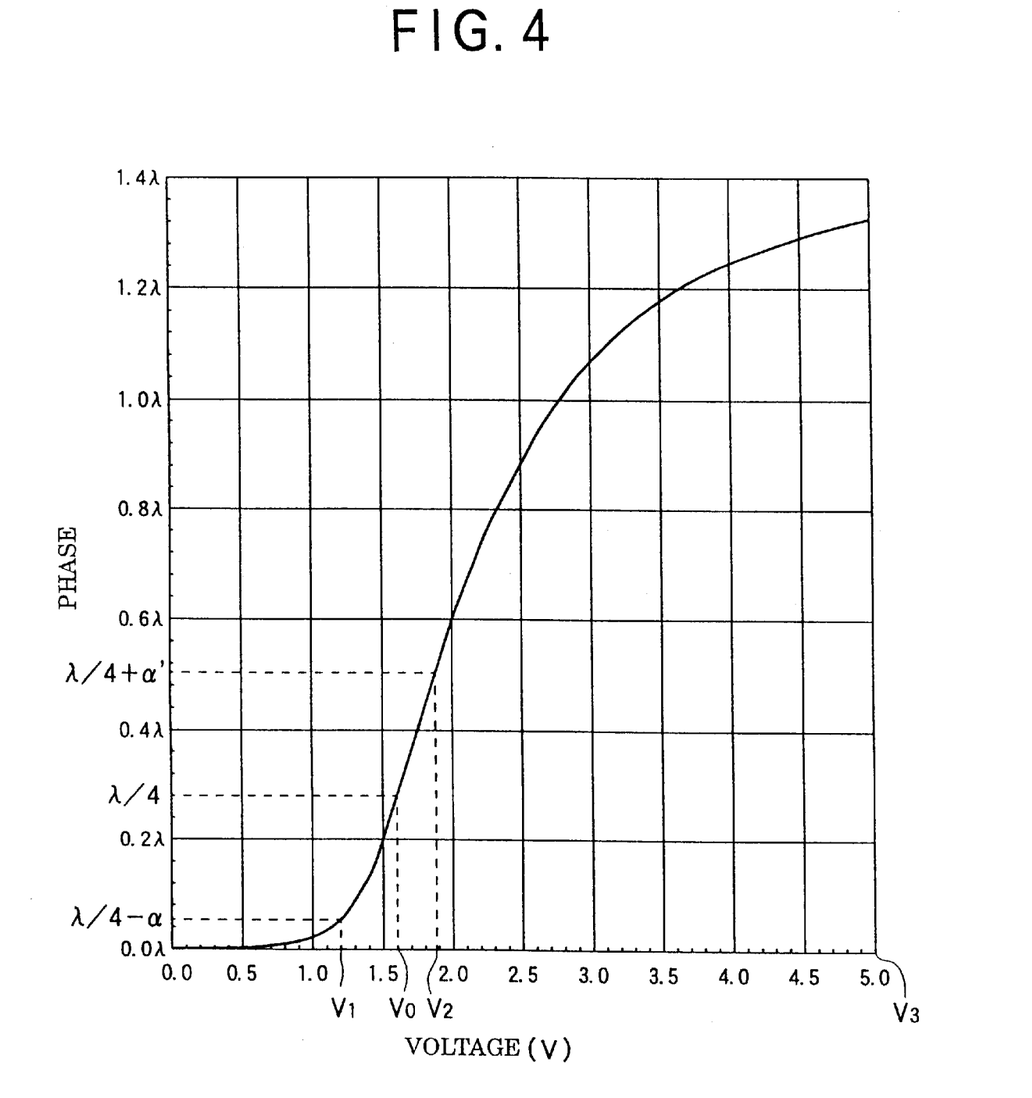
FIG. 4 is a graph indicating a relationship between the driving voltage and a phase in the first embodiment.

At this time, the orientation direction of each of the liquid crystal molecules M in the liquid crystal layer 3e is parallel to each optical axis in a condition that the voltage is not applied by the driving signal Sd (FIG. 3(a)), is rotated in the plane including each optical axis gradually according to the increase of the voltage, and finally becomes perpendicular to each optical axis (FIG. 3(b) to FIG. 3(e)). In this case, if the change of the orientation direction is observed from the side of the transparent electrode 3a for example, as shown in the right side of each of FIG. 3(a) to 3(e), the length of the liquid crystal molecules M gradually increase in the orientation direction due to the orientation films 3c and 3d. The orientation direction in the plane perpendicular to each optical axis at this time (the angle AG in FIG. 3(c)) is kept to be constant of 45 degrees with respect to the direction of the P polarization plane and the S polarization plane of the light beam B.

Next, the driving voltage is actually applied to the liquid crystal molecules M by the driving signal Sd as follows. Namely, as shown in FIG. 4, a driving voltage $V_0$ necessary to give the phase difference, which corresponds to ¼ of the wavelength λ of the light beam B and the reflection light Br, to the light beam B and the reflection light Br, is used as a standard (refer to FIG. 3(c)). Depending upon the polarity of the birefringence generated at each time, when the birefringence is increased by α, the driving voltage is decreased from $V_0$ to $V_1$ so as to give the canceling phase difference −α, which is to cancel the increase of the birefringence, to the light beam B and the reflection light Br, so that the sum of the added phase differences (i.e., the sum of the phase difference of ¼ wavelength of the light beam B and the canceling phase difference) is decreased (refer to FIG. 3(b)). On the other hand, when the birefringence is decreased by α', the driving voltage is increased from $V_0$ to $V_2$ so as to give the canceling phase difference +α', which is to cancel the decrease of the birefringence, to the light beam B and the reflection light Br, so that the sum of the added phase differences is increased (refer to FIG. 3(d)).

The control for the polarity and the amount of the canceling phase difference to be generated is performed as follows. Namely, by always monitoring the amplitude of the light detection signal Sp, which is detected at the amplitude detection circuit 8, by the driver 7, when the monitored amplitude at a certain timing is larger than the amplitude at a previous timing thereof, the control is performed so as to increase the voltage value of the driving signal Sd so that a canceling phase difference whose polarity is the same and whose amount is the larger is generated since it is assumed that the birefringence is being removed. On the other hand, when the monitored amplitude at a certain timing is smaller than the amplitude at a previous timing thereof, the control is performed so as to decrease the voltage value of the driving signal Sd so that a canceling phase difference whose polarity is the same and whose amount is the smaller is generated since it is assumed that excessive canceling phase difference is being given after the birefringence has been removed as much as possible. At this time, when the amplitude does not become the maximum even after the canceling phase difference is changed to be zero, the voltage value of the driving signal Sd is further controlled so as to generate a canceling phase difference whose polarity is the reverse.

In this manner, when the amplitude of the light detection signal Sp becomes the maximum, the appropriate canceling phase difference is given to thereby remove the birefringence.

As described above, according to the operation of the liquid crystal panel 3 of the first embodiment, in case of compensating the birefringence by giving the canceling phase difference to the light beam B and the reflection light Br by controlling the orientation direction of the liquid crystal molecules M in the liquid crystal layer 3e, the canceling phase difference is generated just by changing the orientation direction in the plane including each optical axis. That is to say, the canceling phase difference is generated without changing the direction of the linearly polarized plane of the light beam B or the reflection light Br (i.e., without rotating the direction of the linearly polarized plane). Thus, it is possible to electrically compensate the birefringence effectively, which is generated in the light beam B and the reflection light Br.

Therefore, in case of reproducing the information on the optical disc DK by using the light beam B and the reflection light Br, it is possible to reproduce the information precisely by means of a relatively simple construction.

Since the amplitude of the light detection signal Sp is monitored and the canceling phase difference is added so that the value of the monitored amplitude may become the maximum, it is possible to compensate the birefringence by means of a relatively simple construction.

Further, since the orientation direction within the plane perpendicular to each optical axis is made constant by the orientation films 3c and 3d and since the canceling phase difference is generated by changing the orientation direction in the plane including each optical axis by the transparent electrodes 3a and 3b, it is possible to effectively compensate the birefringence.

Furthermore, the orientation direction in the plane perpendicular to each optical axis is set to be constant of 45 degrees with respect to each linearly polarized plane of the light beam B. The driving signal Sd is controlled so that the canceling phase difference is generated by changing the orientation direction with respect to the orientation direction, which gives to the light beam B the phase difference corresponding to the ¼ of the wavelength of the light beam B, as a center. Therefore, since the liquid crystal panel 3 functions as a so-called ¼ wavelength plate with respect to the light beam B, there is no need to equip such a ¼ wavelength plate separately.

On the other hand, since only the orientation direction within the plane including each optical axis is changed, it is not necessary to employ a liquid crystal material, which is designed to change the orientation direction in the plane perpendicular to each optical axis, for the material constituting the liquid crystal layer 3e. Thus, it is possible to simplify the adjustment for the liquid crystal material.

More concretely, in case of constituting the liquid crystal having a twist between the orientation film 3c and the orientation film 3d in the conventional manner, it is necessary to employ a so-called twisted nematic liquid crystal as the liquid crystal material constituting the liquid crystal layer, and in order to adjust this twisted nematic liquid crystal, it is also necessary to mix a so-called chiral nematic liquid crystal to a so-called nematic liquid crystal. Then, since the spiral pitch (which is a distance in the direction of each optical axis for the liquid crystal molecules to rotate one turn in the plane perpendicular to each optical axis by twisting) of the liquid crystal molecules between the orientation film 3c and the orientation film 3d is varied depending upon the added amount of this chiral nematic liquid crystal to the nematic liquid crystal layer, it is necessary to set the added amount of this chiral nematic liquid crystal on the basis of the thickness of the liquid crystal layer and the twist angle. Further, since the spiral pitch is changed depending upon the temperature (i.e., the spiral pitch becomes longer as the temperature increases, while the spiral pitch becomes shorter as the temperature decreases), it is necessary to strictly set the added amount of the chiral nematic liquid crystal with considering the degree of the change of the spiral pitch. In contrast to this, in case of the first embodiment of the present invention, since the addition of the chiral nematic liquid crystal itself (i.e., the liquid crystal material to change the orientation direction in the plane perpendicular to each optical axis) is not necessary, it is possible to simplify the adjustment of the liquid crystal material constituting the liquid crystal layer 3e.

Incidentally, in the above described first embodiment, the liquid crystal panel 3 is disposed between the objective lens 4 and the PBS 2. Other than this, it is possible to obtain the same effect by disposing the liquid crystal panel 3 between the objective lens 4 and the optical disc DK.

(II) Second Embodiment

Next, a second embodiment of the present invention is explained with reference to FIGS. 5 and 6.

Figure 5:
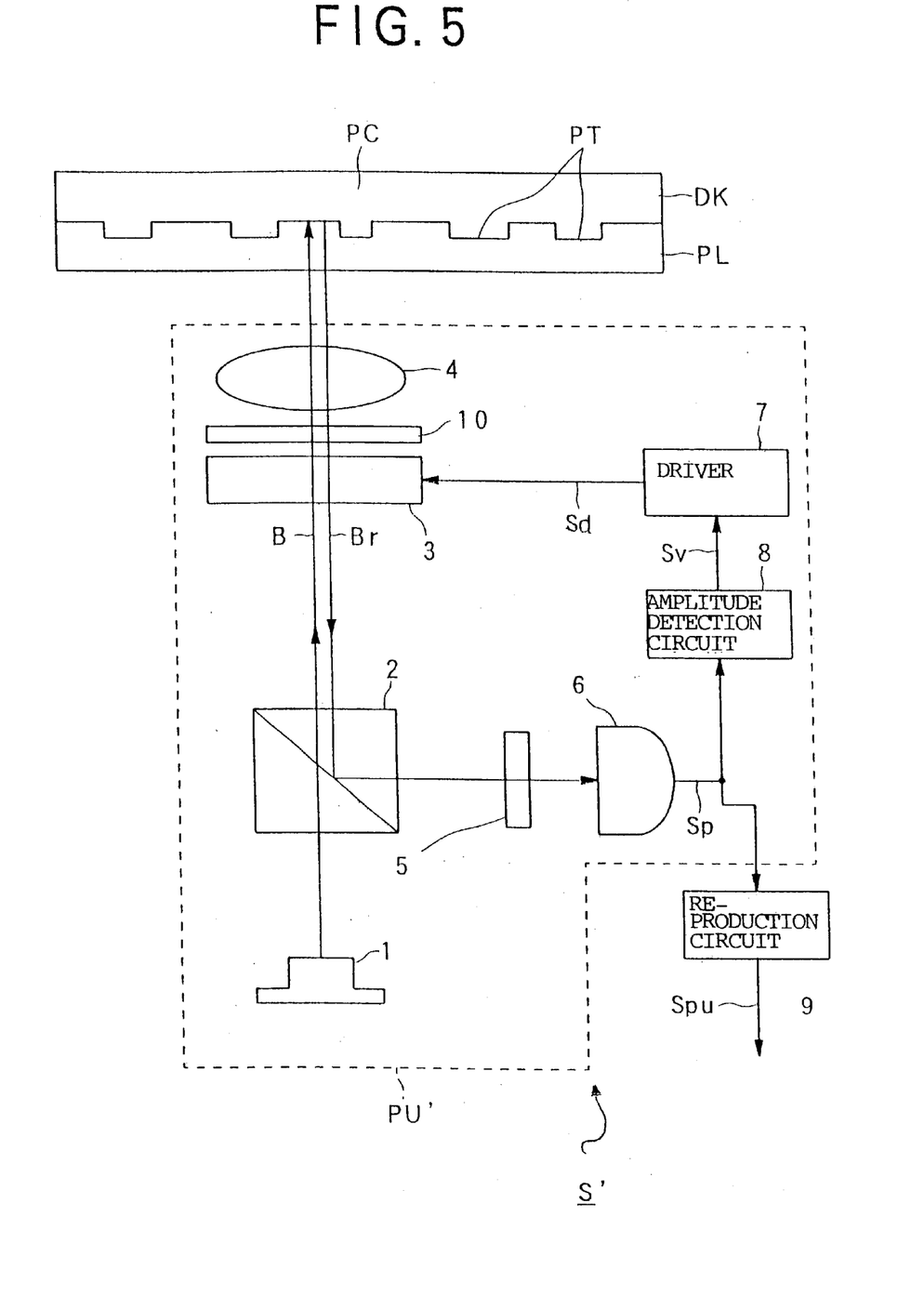
FIG. 5 is a block diagram showing a schematic construction of an information reproducing apparatus as a second embodiment of the present invention.
Figure 6:
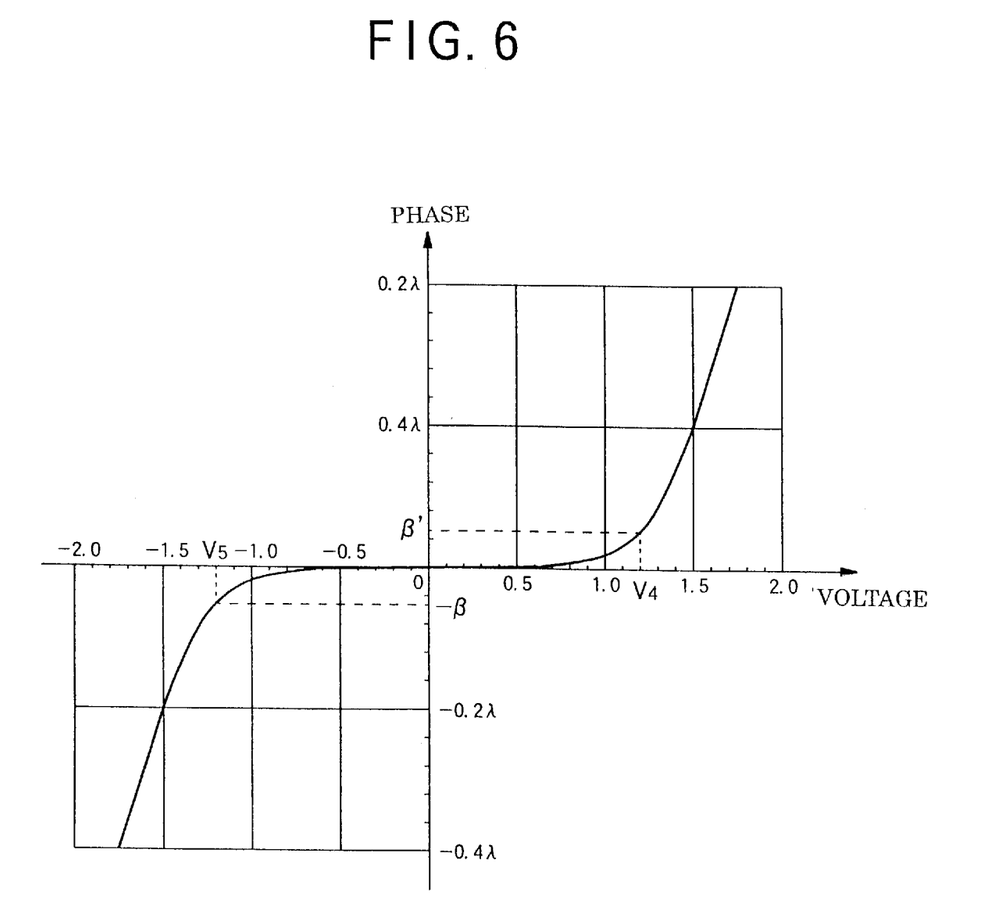
FIG. 6 is a graph indicating a relationship between the driving voltage and a phase in the second embodiment.

FIG. 5 is a block diagram showing a schematic configuration of the information reproducing apparatus of the second embodiment. FIG. 6 is a graph showing a relationship between the voltage of the driving signal Sd in the actual liquid crystal panel 3 and the phase difference in the light beam B and the reflection light Br generated by the voltage (which is standardized by the wavelength of the light beam B) in the second embodiment.

In the information reproducing apparatus of the second embodiment shown in FIG. 5, the same constitutional elements as those in the information reproducing apparatus S of the first embodiment shown in FIG. 1 carry the same reference numerals and the detailed explanations thereof are omitted.

In the above described first embodiment, the canceling phase difference to cancel the birefringence is generated in the light beam B and the reflection light Br by the liquid crystal panel 3, while the driving voltage of the driving signal Sd is controlled so that the liquid crystal panel 3 has the function as the ¼ wavelength plate (refer to FIG. 4). In contrast, in the second embodiment, a ¼ wavelength plate is equipped separately from the liquid crystal panel 3, commonly on the optical paths of the light beam B and the reflection light Br respectively, while the liquid crystal panel 3 is constituted to have only the function to generate the canceling phase difference.

Namely, as shown in FIG. 5, an optical pickup PU' in an information reproducing apparatus S' in the second embodiment is constructed such that a ¼ wavelength plate 10, which is to convert the light beam B from the linearly polarized light to the circularly polarized light and convert the reflection light Br from the circularly polarized light to the linearly polarized light, is disposed between the liquid crystal panel 3 and the objective lens 4.

Then, the liquid crystal panel 3 is controlled such that, when the birefringence is not generated, the canceling phase difference is not added by setting the driving voltage of the driving signal Sd to zero, and that, only when the birefringence +β or −β to be removed is generated, the driving signal Sd is controlled to make the driving voltage to $V_5$ or $V_4$ (refer to FIG. 6) so that the canceling phase difference −β or +β (refer to FIG. 6) is generated for the light beam B and the reflection light Br by the same operation of the driver 7 as in the case of the first embodiment.

More concretely, when the positive birefringence +β is generated, in order to cancel this, the driving voltage is set to $V_5$ so as to generate the negative canceling phase difference −β. On the other hand, when the negative birefringence −β is generated, in order to cancel this, the driving voltage is set to $V_4$ so as to generate the positive canceling phase difference +β.

The processes other than the above mentioned driving voltage control to add only the canceling phase difference by the liquid crystal panel 3, including the control for the change of the orientation direction of the liquid crystal molecules M in the liquid crystal panel 3 as well as the aspects of the change of the orientation direction, in the information reproducing apparatus S' of the second embodiment are similar to those in the first embodiment, and the detailed explanations thereof are omitted.

As described above, according to the operation of the optical pickup PU' of the second embodiment, in case of compensating the birefringence by giving the canceling phase difference to the light beam B and the reflection light Br by controlling the orientation direction of the liquid crystal molecules M in the liquid crystal layer 3e, the canceling phase difference is generated just by changing the orientation direction in the plane including each optical axis. That is to say, the canceling phase difference is generated without changing the direction of the linearly polarized plane of the light beam B or the reflection light Br (i.e., without rotating the direction of the linearly polarized plane). Thus, it is possible to electrically compensate the birefringence effectively, which is generated in the light beam B and the reflection light Br.

Therefore, in case of reproducing the information on the optical disc DK by using the light beam B and the reflection light Br, it is possible to reproduce the information precisely by means of a relatively simple construction.

Since the amplitude of the light detection signal Sp is monitored and the canceling phase difference is added so that the value of the monitored amplitude may become the maximum, it is possible to compensate the birefringence by means of a relatively simple construction.

Further, since the orientation direction within the plane perpendicular to each optical axis is made constant by the orientation films 3c and 3d and since the canceling phase difference is generated by changing the orientation direction in the plane including each optical axis by the transparent electrodes 3a and 3b, it is possible to effectively compensate the birefringence.

Incidentally, in the second embodiment, other than the position indicated in FIG. 5, the position of the liquid crystal panel 3 may be between the ¼ wavelength plate 10 and the objective lens 4 or between the objective lens 4 and the optical disc DK.

(III) Third Embodiment

Next, a third embodiment of the present invention is explained with reference to FIG. 7.

Figure 7:
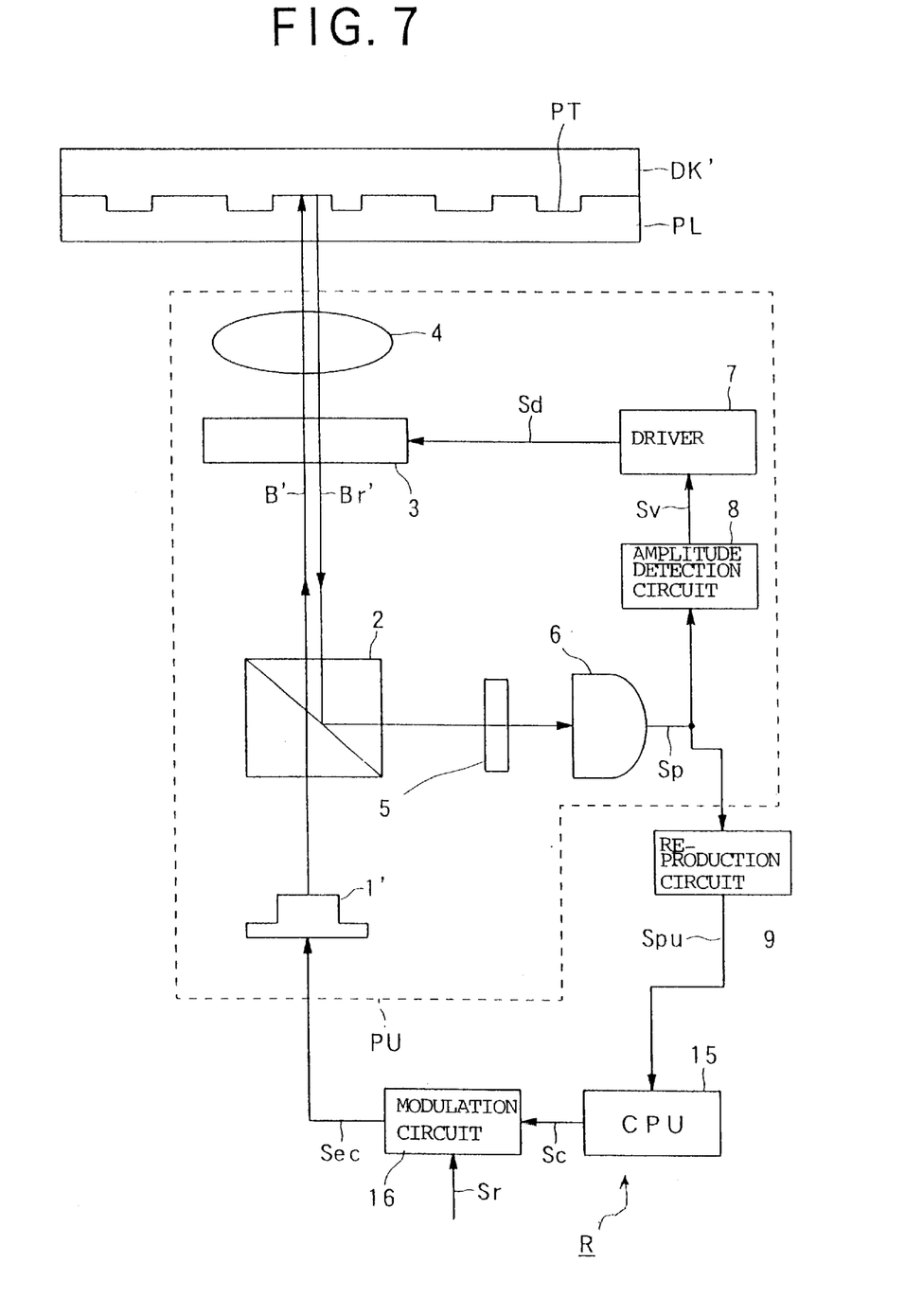
FIG. 7 is a block diagram showing a schematic construction of an information reproducing apparatus as a third embodiment of the present invention.

FIG. 7 is a block diagram showing a schematic configuration of the information recording apparatus of the third embodiment.

In the above described first and second embodiments, the present invention is applied to the information reproducing apparatus. In contrast, the present invention can be applied to an information recording apparatus for recording information onto a recordable optical disc as in the third embodiment.

Namely, as shown in FIG. 7, the present invention can be applied to an information recording apparatus R for recording record information onto an optical disc DK', by irradiating a light beam B', which is modulated on the basis of the record information to be recorded, onto the optical disc DK' while reproducing record control information, which is recorded in advance on the optical disc DK'. The optical disc DK' is recordable, on which information indicative of output setting of the light beam at the time of recording and address information indicative of a position at which the information is to be recorded are recorded in advance as the record control information.

In this case, the information recording apparatus R is provided with: a CPU for generating a control signal Sc to control a modulation circuit 16 on the basis of the reproduction signal Spu from the reproduction circuit 9; and the modulation circuit 16 as one example of a modulating device for modulating a record signal Sr corresponding to the record information inputted from the external portion and generating a modulation signal Sec to thereby control the oscillation intensity of a laser diode 1' as one example of a recording device, which is capable of controlling the oscillation intensity, in addition to the PBS 2, the liquid crystal panel 3, the objective lens 4, the cylindrical lens 5, the detector 6, the driver 7, the amplitude detection circuit 8 and the reproduction circuit 9 which are similar to the first embodiment.

At this time, the light detection signal Sp is generated, which corresponds to the above mentioned record control information, as a light beam B' having a predetermined intensity is emitted and a reflection light Br' thereof is received by the detector 6 in advance of recording the record information. Further, as the reproduction circuit 9 reproduces the detection signal Sp to thereby obtain the reproduction signal Spu and the CPU 15 generates a control signal Sc on the basis of the record control information included in the obtained reproduction signal Spu, the record information is recorded at a predetermined record position on the optical disc DK' and the modulation signal Sec to control the intensity of the light beam B' for recording is generated.

Then, the birefringence generated in the light beam B' or the reflection light Br is removed by the operations of the liquid crystal panel 3 and the driver 7 when the record control information is detected, in the same manner as the case of the above described first embodiment.

The operations as for detecting the record control information other than the above mentioned operation are similar to the information detecting operation in the first embodiment, and the detailed explanations thereof are omitted.

After that, the record signal Sr is modulated by the modulation circuit 16 on the basis of the reproduced record control information, and the modulation signal Sec is generated. Then, the light beam B' is generated at the intensity corresponding to the modulation signal Sec, and is recorded onto the optical disc DK'.

As described above, according to the operation of the information recording apparatus R of the third embodiment, when detecting the record control information on the optical disc DK', in case of compensating the birefringence by giving the canceling phase difference to the light beam B and the reflection light Br by controlling the orientation direction of the liquid crystal molecules M in the liquid crystal layer 3e in the liquid crystal panel 3, the canceling phase difference is generated just by changing the orientation direction in the plane including each optical axis. Thus, it is possible to electrically compensate the birefringence effectively, which is generated in the light beam B and the reflection light Br.

Therefore, in case of reproducing the record control information on the optical disc DK' by using the light beam B and the reflection light Br, it is possible to precisely reproduce the record control information precisely by means of a relatively simple construction.

Since the amplitude of the light detection signal Sp is monitored and the canceling phase difference is added so that the value of the monitored amplitude may become the maximum, it is possible to compensate the birefringence by means of a relatively simple construction.

Further, since the orientation direction within the plane perpendicular to each optical axis is made constant by the orientation films 3c and 3d and since the canceling phase difference is generated by changing the orientation direction in the plane including each optical axis by the transparent electrodes 3a and 3b, it is possible to effectively compensate the birefringence.

Furthermore, the orientation direction in the plane perpendicular to each optical axis is set to be constant of 45 degrees with respect to each linearly polarized plane of the light beam B. The driving signal Sd is controlled so that the canceling phase difference is generated by changing the orientation direction with respect to the orientation direction, which gives to the light beam B the phase difference corresponding to the ¼ of the wavelength of the light beam B, as a center. Therefore, since the liquid crystal panel 3 functions as a so-called ¼ wavelength plate with respect to the light beam B, there is no need to equip such a ¼ wavelength plate separately.

Incidentally, in the above described third embodiment, the information recording apparatus, which corresponds to the first embodiment, is explained. However, it is also possible to add the CPU 15 and the modulation circuit 16 to the information reproducing apparatus S' of the second embodiment, to realize the corresponding information recording apparatus by controlling it to operate in the same manner as the third embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-74220 filed on Mar. 18, 1999 including the specification, claims, drawings and summary is incorporated herein by reference in its entirety.

What is claimed is:

1. An optical pickup comprising:

a light emitting device for emitting a light beam onto a record medium comprising a transparent layer, which is transparent for the light beam and through which the light beam is transmitted;

a light receiving device for receiving a reflection light of the light beam from said record medium;

a liquid crystal compensating device for compensating birefringence, which is generated in the light beam when the light beam is transmitted through the transparent layer, on the basis of the reflection light received by said light receiving device, by controlling an orientation direction of liquid crystal molecules in a liquid crystal layer so as to give a canceling phase difference, which is to cancel the birefringence, to the light beam transmitted through the liquid crystal layer;

a generating device for generating an indication signal indicative of the birefringence on the basis of the reflection light received by said light receiving device; and a controlling device for controlling the orientation direction on the basis of the indication signal so that a first angle between a standard line, which is perpendicular to an optical axis of the light beam and is set in advance, and the orientation direction in a plane perpendicular to the optical axis is kept to be constant and that a second angle between the optical axis and the orientation direction in a plane including the optical axis is changed, to thereby generate the canceling phase difference in the light beam transmitted through the liquid crystal compensating device.

2. An optical pickup according to claim 1, wherein said light receiving device generates a light detection signal, and said generating device generates the indication signal such that the indication signal indicates a cancellation of the birefringence by the canceling phase difference when the amplitude of the light detection signal becomes the maximum and outputs the generated indication signal to said controlling device.

3. An optical pickup according to claim 1, wherein said liquid crystal compensating device comprises:

the liquid crystal layer;

two orientation films, which is disposed to sandwich the liquid crystal layer and is transparent for the light beam, for orienting the liquid crystal molecules such that the first angle is kept to be constant as for all of the liquid crystal molecules; and a voltage applying device, which is disposed to sandwich the liquid crystal layer and the orientation films and is transparent for the light beam, for applying a control voltage, which is to control the second angle, to the liquid crystal molecules.

4. An optical pickup according to claim 3, wherein the orientation films are formed such that the first angle is 45 degrees with respect to each linearly polarized plane of the light beam before the light beam is transmitted through the liquid crystal layer, and said controlling device controls the orientation direction so that the canceling phase difference is generated in the light beam by changing the second angle with the second angle as a center, which gives to the light beam a phase difference corresponding to ¼ of a wavelength of the light beam.

5. An information recording apparatus comprising (A) an optical pickup comprising:

a light emitting device for emitting a light beam onto a record medium comprising a transparent layer, which is transparent for the in light beam and through which the light beam is transmitted;

a light receiving device for receiving a reflection light of the light beam from said record medium;

a liquid crystal compensating device for compensating birefringence, which is generated in the light beam when the light beam is transmitted through the transparent layer, on the basis of the reflection light received by said light receiving device, by controlling an orientation direction of liquid crystal molecules in a liquid crystal layer so as to give a canceling phase difference, which is to cancel the birefringence, to the light beam transmitted through the liquid crystal layer;

a generating device for generating an indication signal indicative of the birefringence on the basis of the reflection light received by said light receiving device; and a controlling device for controlling the orientation direction on the basis of the indication signal so that a first angle between a standard line, which is perpendicular to an optical axis of the light beam and is set in advance, and the orientation direction in a plane perpendicular to the optical axis is kept to be constant and that a second angle between the optical axis and the orientation direction in a plane including the optical axis is changed, to thereby generate the canceling phase difference in the light beam transmitted through the liquid crystal compensating device, (B) a detecting device for detecting record control information, which is recorded in advance on said record medium, on the basis of the reflection light received by said light receiving device, and (C) a modulating device for modulating record signal to be recorded onto said record medium on the basis of the detected record control information, to thereby generate a modulation signal which controls said light emitting device to emit the light beam having an intensity corresponding to the modulation signal.

6. An information recording apparatus according to claim 5, wherein said light receiving device generates a light detection signal, and said generating device generates the indication signal such that the indication signal indicates a cancellation of the birefringence by the canceling phase difference when the amplitude of the light detection signal becomes the maximum and outputs the generated indication signal to said controlling device.

7. An information recording apparatus according to claim 5, wherein said liquid crystal compensating device comprises:

the liquid crystal layer;

two orientation films, which is disposed to sandwich the liquid crystal layer and is transparent for the light beam, for orienting the liquid crystal molecules such that the first angle is kept to be constant as for all of the liquid crystal molecules; and a voltage applying device, which is disposed to sandwich the liquid crystal layer and the orientation films and is transparent for the light beam, for applying a control voltage, which is to control the second angle, to the liquid crystal molecules.

8. An information recording apparatus according to claim 7, wherein the orientation films are formed such that the first angle is 45 degrees with respect to each linearly polarized plane of the light beam before the light beam is transmitted through the liquid crystal layer, and said controlling device controls the orientation direction so that the canceling phase difference is generated in the light beam by changing the second angle with the second angle as a center, which gives to the light beam a phase difference corresponding to ¼ of a wavelength of the light beam.

9. An information reproducing apparatus comprising (A) an optical pickup comprising:

a light emitting device for emitting a light beam onto a record medium comprising a transparent layer, which is transparent for the light beam and through which the light beam is transmitted;

a light receiving device for receiving a reflection light of the light beam from said record medium;

a liquid crystal compensating device for compensating birefringence, which is generated in the light beam when the light beam is transmitted through the transparent layer, on the basis of the reflection light received by said light receiving device, by controlling an orientation direction of liquid crystal molecules in a liquid crystal layer so as to give a canceling phase difference, which is to cancel the birefringence, to the light beam transmitted through the liquid crystal layer;

a generating device for generating an indication signal indicative of the birefringence on the basis of the reflection light received by said light receiving device; and a controlling device for controlling the orientation direction on the basis of the indication signal so that a first angle between a standard line, which is perpendicular to an optical axis of the light beam and is set in advance, and the orientation direction in a plane perpendicular to the optical axis is kept to be constant and that a second angle between the optical axis and the orientation direction in a plane including the optical axis is changed, to thereby generate the canceling phase difference in the light beam transmitted through the liquid crystal compensating device, and (B) a reproducing device for reproducing record information, which is recorded in advance on said record medium, on the basis of the reflection light received by said light receiving device, to thereby output a reproduction signal to an external portion.

10. An information reproducing apparatus according to claim 9, wherein said light receiving device generates a light detection signal, and said generating device generates the indication signal such that the indication signal indicates a cancellation of the birefringence by the canceling phase difference when the amplitude of the light detection signal becomes the maximum and outputs the generated indication signal to said controlling device.

11. An information reproducing apparatus according to claim 9, wherein said liquid crystal compensating device comprises:

the liquid crystal layer;

two orientation films, which is disposed to sandwich the liquid crystal layer and is transparent for the light beam, for orienting the liquid crystal molecules such that the first angle is kept to be constant as for all of the liquid crystal molecules; and a voltage applying device, which is disposed to sandwich the liquid crystal layer and the orientation films and is transparent for the light beam, for applying a control voltage, which is to control the second angle, to the liquid crystal molecules.

12. An information reproducing apparatus according to claim 11, wherein the orientation films are formed such that the first angle is 45 degrees with respect to each linearly polarized plane of the light beam before the light beam is transmitted through the liquid crystal layer, and said controlling device controls the orientation direction so that the canceling phase difference is generated in the light beam by changing the second angle with the second angle as a center, which gives to the light beam a phase difference corresponding to ¼ of a wavelength of the light beam.

* * * * *